Patented Mar. 14, 1939

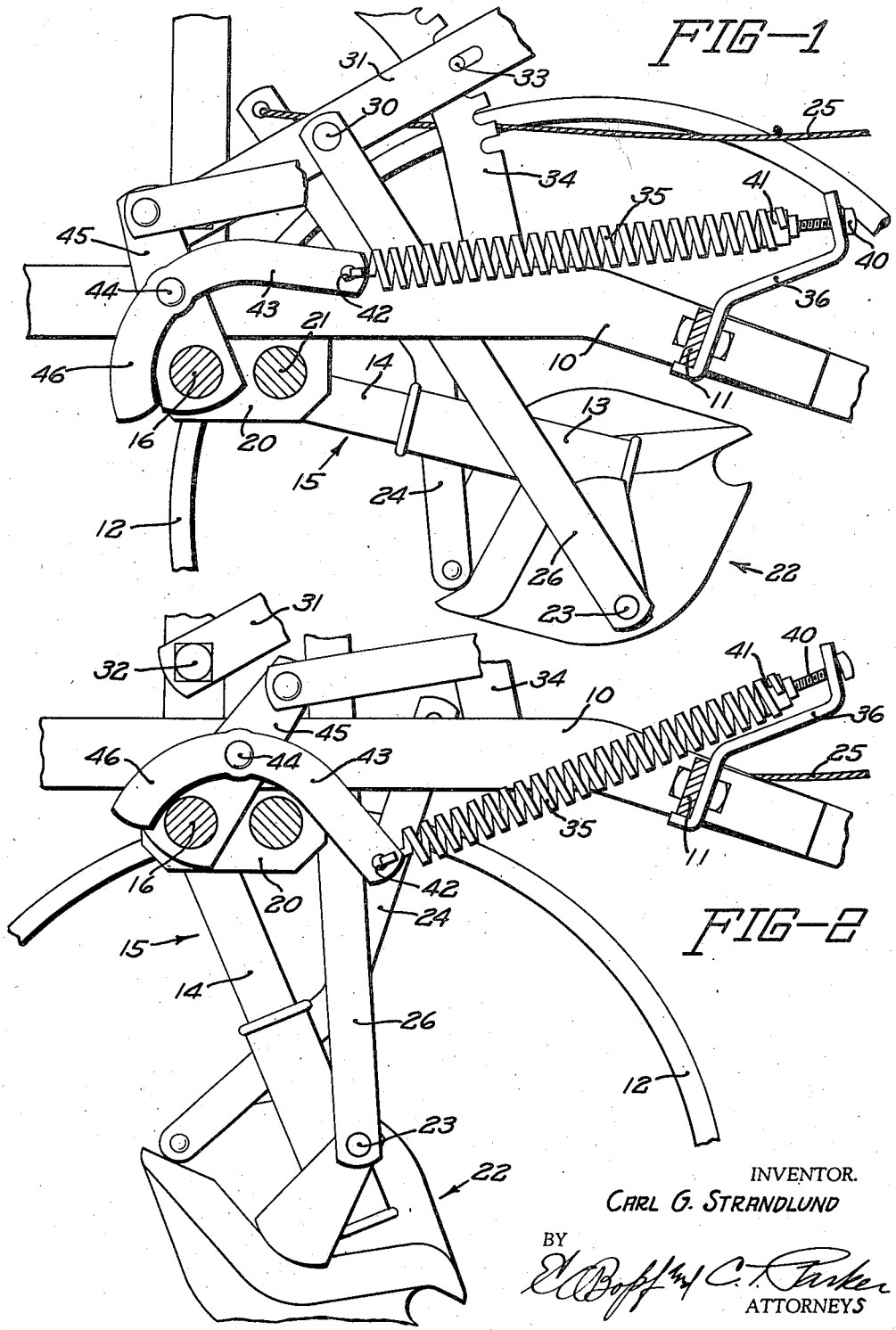

2,150,661

UNITED STATES PATENT OFFICE 2,150,661

PLOW

Carl G. Strandlund, Moline, Ill., assignor to Deere & Company, Moline, Ill., a corporation of Illinois Application March 21, 1938, Serial No. 197,170

6 Claims. (Cl. 97—73)

The present invention relates to wheel supported plows and more particularly to that type in which traction power is utilized to lift the plow out of the ground to a transport position. The principal object of my invention is to provide means operative to add to the power employed in raising the plow out of plowing position and to exert an assisting force in the initial lowering movement of the plow, and is in the nature of an improvement on my Patents Nos. 1,675,433, issued July 3, 1928, and 1,859,896, issued May 24, 1932.

Another object of the present invention is to provide means for utilizing the conventional counterbalancing spring provided on most present day power lift plows to assist the power lift mechanism in overcoming any tendency for the plow to hesitate when lowered from a raised position with the depth adjusting mechanism set for minimum plowing depth, at which time the wheel supporting crank axles are disposed at an angle to the ground approaching the perpendicular. This tendency to hesitate is sometimes encountered in extremely soft or trashy soil conditions when lowering the implement into the ground.

These and other objects and advantages of the present invention will become apparent after a consideration of the following detailed description and appended drawing, in which Figure 1 is a sectional side view of a portion of a plow embodying my invention, the plow being shown in its plowing position; and Fig. 2 is a view similar to Figure 1 showing the same plow in transport position.

Inasmuch as the present invention is concerned solely with the mechanism for raising and lowering the plow frame between ground engaging and transport positions, only such parts as are directly related with, or otherwise affect the operation of the power lift mechanism, have been shown. Referring now to the drawing, the frame of the plow includes a fore and aft extending beam 10 which is connected by suitable cross members, including a transverse bar 11, to a similar beam (not shown) spaced laterally therefrom. The portion of the implement frame shown is supported on a land wheel 12 which is journaled in a suitable axle housing 13 carried at the end of the arm 14 of a crank axle 15. The transverse portion 16 of the crank axle 15 is journaled in bearing plates 20 fixed to the beams 10, while the transverse portion 21 of a furrow wheel crank axle (not shown) is likewise journaled in the same bearing plates 20.

The power lift mechanism for the implement comprises a power lift clutch 22 carried on the axle housing 13 and connected with the frame by suitable linkage to transmit lifting effort for raising the frame. This type of power lift clutch is well known and need not be described in detail, it being sufficient to say that the tripping or engagement of the clutch transmits the traction power of the land wheel 12 to a crank pin 23 for causing the latter to swing through a half revolution about the axis of the land wheel. The clutch is engaged by the actuation of a tripping lever 24 from which a rope 25 extends to the driver's position on the tractor so that the lifting and lowering of the plow can be controlled from this position. A link 26 extends upwardly from the crank pin 23 and is pivotally connected at 30 to a depth adjusting lever 31 which is pivotally supported on the frame by means of a pivot bolt 32. This depth adjusting lever 31 carries a suitable latching dog 33 for engaging with a notched latching sector 34 to hold the lever 31 in different depth adjustments. It will be evident that vertical movement of the lever 31 will act through the link 26 to swing the crank axle 15 forwardly or rearwardly relative to the frame and thereby lower or raise the frame to different depth adjustments.

The power lift mechanism is assisted in raising the implement frame by means of a counterbalancing spring 35 which is anchored at one end to the frame and connected at the other end to the crank axle 15 through suitable linkage to exert a lifting force upon the axle, counterbalancing part of the weight of the implement. In the embodiment illustrating my invention, I have shown the spring 35 anchored to a bracket member 36 which is bolted to the transverse bar 11 and extends forwardly and upwardly therefrom. A connecting bolt 40 in threaded engagement with a nut 41 fixed to the forward end of the spring 35 provides an adjustable connection between the latter and the bracket member 36. The rear end of the spring 35 is hooked through an aperture 42 in a link 43, which is pivotally connected by a pin 44 to a vertically extending lever arm 45 fixed to the crank axle 16. For the sake of convenience I have chosen to connect link 43 to the lever arm 45 which comprises part of the linkage interconnecting the land wheel axle 15 and furrow wheel axle 21 to apply the lifting force exerted by the clutch 22 to both crank axles. However, it will be evident that any lever fixed to the crank axle 15 at substantially the same angle relative to the crank arm 14 would serve equally well. The link 43 is provided with a downwardly curved arm 46 to form a bell crank which is adapted to bear against the horizontal portion 16 of the crank axle 15 when the latter has swung rearwardly past a predetermined point intermediate its range of swing.

When the lifting clutch is actuated from the plowing position illustrated in Figure 1, the counterbalancing spring 35, which is under tension, exerts a turning moment upon crank axle 15 tending to swing the latter downwardly and rearwardly to assist the clutch in lifting the implement frame to transport position. By virtue of its position approximately perpendicular to the line of the direction of force exerted by the spring 35, the lever arm 45 has a substantially constant moment arm throughout the range of plowing depth adjustments. The result is a fairly constant and sustained pull exerted on the crank axle at any plowing depth, which materially aids the lifting clutch in overcoming the inertia of the implement and the soil resistance and boosting the frame up to a point from which the traction power of the land wheel is ample to complete the operation.

However, with the implement adjusted to plow comparatively shallow, the degree of lift is higher when the implement is raised to transport position than when adjusted for deep plowing, and this necessarily means that the crank axle of the land wheel stands in a more nearly vertical position so that the weight of the implement does not exert much rotative force on said axle tending to swing the same forwardly for lowering the plow when the lift mechanism is tripped. It is to overcome this difficulty that the link 43 was added, and to this end the arm 46 is adapted to contact the transverse portion 16 of the crank axle 15 when the latter has swung rearwardly past a certain predetermined point. From this point on, the link 43 rotates coadunatively with the lever arm 45, providing a lever arm on the opposite side of the axis of crank axle 15 relative to the lever arm 45, through which the spring is connected to the crank axle 15. Thus, the turning moment exerted upon the crank axle by the spring 35 is reversed in direction as the crank arm 14 approaches the vertical, and further rearward swinging of the crank axle serves to stretch the spring 35 and store energy therein. Inasmuch as the lever arm is changed from one side of the axis to the other at the moment the aperture 42 passes a line drawn through the center of the transverse axle portion 16 and the point of connection of bolt 40 with the bracket member 36, it will be seen that the moment arm increases rapidly thereafter so that as the crank arm 14 becomes more nearly vertical and the need for an initial boost in lowering the implement becomes greater, the turning moment exerted on the crank axle by the spring 35 becomes correspondingly greater.

What I claim as my invention is:

1. The combination with an implement having a tool carrying frame, a crank axle journaled on said frame, and means for swinging said crank axle to raise and lower the frame, of a spring anchored at one end to said frame, and linkage connecting the other end of said spring to said axle, said linkage including means for causing said spring to exert a turning moment upon said axle in one direction through a lever arm of one length when the frame is lowered, and in the other direction through a lever arm of another length when the frame is raised.

2. The combination with an implement having a tool carrying frame, a crank axle journaled on said frame, and means for swinging said crank axle to raise and lower the frame, of a spring anchored at one end to said frame, and linkage connecting the other end of said spring to said axle, said linkage including means for causing said spring to exert a turning moment upon said axle in one direction through a lever arm defining a certain angle with the crank of said crank axle when the frame is lowered and in the other direction through a lever arm defining a different angle with the crank of said crank axle when the frame is raised.

3. The combination with an implement having a tool carrying frame, a crank axle journaled on said frame, and means for swinging said crank axle to raise and lower the frame, of a spring anchored at one end to said frame, and linkage connecting the other end of said spring to said axle, said linkage including means for causing said spring to exert a turning force upon said axle at one point when the frame is lowered and at a different point when the frame is raised.

4. The combination with an implement having a tool carrying frame, a crank axle journaled on said frame, and means for swinging said crank axle to raise and lower the frame, of a spring anchored at one end to said frame, and linkage connecting the other end of said spring to said axle, said linkage comprising an arm fixed to said axle and a link pivoted to said arm, said spring being connected to said link, and means for limiting the swinging movement of said link relative to said arm at a predetermined position of said crank axle relative to said frame whereby said link thereafter rotates coadunatively with said crank axle.

5. The combination with an implement having a tool carrying frame, a crank axle journaled on said frame, and means for swinging said crank axle to raise and lower the frame, of a spring anchored at one end to said frame, and linkage connecting the other end of said spring to said axle, said linkage comprising an arm fixed to said axle, and a bell crank pivoted to said arm, said spring being connected to one arm of said bell crank, and the other arm of said bell crank being adapted to contact said axle when the latter is swung to a certain point whereby said bell crank thereafter rotates coadunatively with said crank axle.

6. The combination with an implement having a tool carrying frame, a crank axle journaled on said frame, and means for swinging said crank axle to raise and lower the frame, of a spring anchored at one end to said frame, and linkage connecting the other end of said spring to said axle, said linkage comprising an arm fixed to said axle and a link pivoted to said arm, said spring being connected to said link, and means for causing said link to rotate coadunatively with said crank axle after the latter has swung past a predetermined angle relative to said frame.

CARL G. STRANDLUND.